(12) United States Patent
Tost Bartolome et al.

(10) Patent No.: US 12,230,992 B2
(45) Date of Patent: Feb. 18, 2025

(54) ON-BOARD CHARGER (OBC) METHOD AND SYSTEM FOR DETECTING PHASE CONFIGURATION OF MAINS SUPPLY AND FOR DIAGNOSING STATUS OF OBC PHASE CONFIGURATION RELAYS

(71) Applicant: Lear Corporation, Southfield, MI (US)

(72) Inventors: Jordi Tost Bartolome, Valls (ES); Cesar Ruano Alvarez, Valls (ES); Josep Ruiz Rodon, Valls (ES); Andre Cartaxo, Valls (ES); Adria Marcos Pastor, Valls (ES)

(73) Assignee: Lear Corporation, Southfield, MI (US)

( * ) Notice: Subject to any disclaimer, the term of this patent is extended or adjusted under 35 U.S.C. 154(b) by 720 days.

(21) Appl. No.: 17/509,245

(22) Filed: Oct. 25, 2021

(65) Prior Publication Data

US 2022/0247199 A1 Aug. 4, 2022

Related U.S. Application Data

(60) Provisional application No. 63/143,117, filed on Jan. 29, 2021.

(51) Int. Cl.
*H02J 7/00* (2006.01)
*B60L 53/24* (2019.01)
*H02J 7/02* (2016.01)
*H02J 7/04* (2006.01)

(52) U.S. Cl.
CPC .......... *H02J 7/00712* (2020.01); *B60L 53/24* (2019.02); *H02J 7/02* (2013.01); *H02J 7/04* (2013.01); *B60L 2210/30* (2013.01); *H02J 2207/20* (2020.01); *H02J 2310/48* (2020.01)

(58) Field of Classification Search
CPC .......... H02J 7/00; H02J 7/007; H02J 7/00711; H02J 7/007112; H02J 7/02; H02J 7/04; H02J 2207/20; H02J 2310/40; H02J 2310/48; B60L 53/14; B60L 53/24
See application file for complete search history.

(56) References Cited

U.S. PATENT DOCUMENTS

| | | | |
|---|---|---|---|
| 9,035,608 B2 * | 5/2015 | Loudot | B60L 53/20 320/109 |
| 9,139,100 B2 * | 9/2015 | Ichikawa | B60L 53/18 |
| 10,530,173 B2 | 1/2020 | Sun et al. | |
| 11,820,235 B2 * | 11/2023 | Jadeborg | H02J 7/0036 |

(Continued)

*Primary Examiner* — Jeffrey A Gblende
(74) *Attorney, Agent, or Firm* — Brooks Kushman P.C.

(57) ABSTRACT

An on-board battery charger (OBC) includes first and second rails which generate first and second detection signals based on voltage events, such as zero-crossing or peak voltage events, of input voltages supplied to the rail circuits. The OBC includes a relay switchable between (i) an opened state in which the relay disconnects the rails whereby the rails can respectively receive first and second phase input voltages from a multi-phase mains supply and (ii) a closed state in which the relay connects the rails whereby the rails can both receive a same input voltage from a single-phase mains supply. A controller determines from a comparison of the detection signals at the same time whether input voltages received by the rails from a mains supply are out-of-phase or in-phase to determine therefrom whether the mains supply is multi-phase or single-phase and/or whether the relay is properly or improperly opened or closed.

20 Claims, 11 Drawing Sheets

(56) References Cited

U.S. PATENT DOCUMENTS

2013/0093394 A1* 4/2013 Iyasu .................. H02J 7/04
   320/109
2020/0083727 A1 3/2020 Sun et al.

* cited by examiner

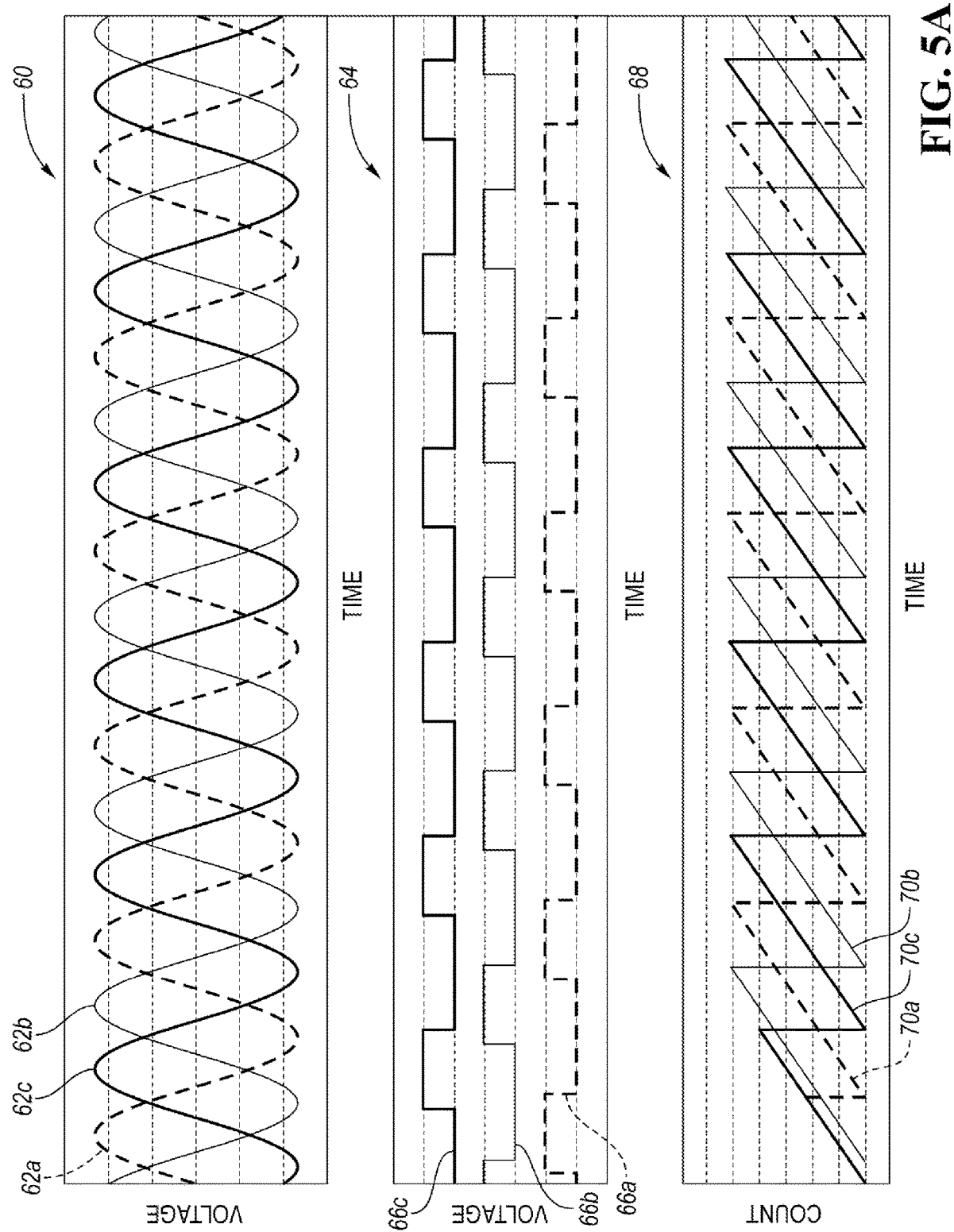

ON-BOARD CHARGER (OBC) METHOD AND SYSTEM FOR DETECTING PHASE CONFIGURATION OF MAINS SUPPLY AND FOR DIAGNOSING STATUS OF OBC PHASE CONFIGURATION RELAYS

CROSS-REFERENCE TO RELATED APPLICATIONS

This application claims the benefit of U.S. Provisional Application No. 63/143,117, filed Jan. 29, 2021, the disclosure of which is hereby incorporated in its entirety by reference herein.

TECHNICAL FIELD

The present invention relates to methods and systems for controlling a multi-phase (i.e., multi-rail) charger such as an on-board battery charger of an electric vehicle.

BACKGROUND

An on-board battery charger (OBC) of an electric vehicle (EV) is used for charging a traction battery of the EV. The OBC converts electrical power absorbed from an AC power source into DC electrical power and charges the battery with the DC electrical power.

SUMMARY

An object includes a method and a system for controlling an on-board battery charger (OBC) of an electric vehicle (EV) to detect phase-shift between input voltages received by the OBC from a mains supply to determine therefrom whether the mains supply is a multi-phase or single-phase mains supply and/or whether phase (i.e., rail) configuration relays of the OBC are properly or improperly positioned in their opened or closed states.

An OBC including a first rail (i.e., rail circuit), a second rail circuit, a relay, and a main controller is provided. The first rail circuit has a first rail controller configured to generate a first detection signal based on voltage events of an input voltage supplied to the first rail circuit. The second rail circuit has a second rail controller configured to generate a second detection signal based on voltage events of an input voltage supplied to the second rail circuit. The relay is switchable between (i) an opened state in which the relay disconnects the rail circuits whereby the first and second rail circuits are configured to respectively receive first and second phase input voltages from a multi-phase mains supply and (ii) a closed state in which the relay connects the rail circuits whereby the rail circuits are configured to both receive a same input voltage from a single-phase mains supply.

The main controller is configured to determine from a comparison of the first detection signal at a given time and the second detection signal at the given time whether an input voltage supplied from a mains supply to the first rail circuit and an input voltage supplied from the mains supply to the second rail circuit are out-of-phase (i.e., non-zero phase offset) or in-phase (i.e., phase offset of 0°) to determine therefrom whether the mains supply is a multi-phase or single-phase mains supply and/or whether the relay is properly or improperly positioned in the opened state or in the closed state.

The voltage events may be threshold voltage events such as zero-crossing voltage events or peak voltage events.

The main controller may be further configured to pause operation of at least one of the rail circuits upon the input voltage supplied to the first rail circuit and the input voltage supplied to the second rail circuit being in-phase when the mains supply is a multi-phase mains supply and the relay is improperly in the closed state. The main controller may be further configured to retry the relay to switch from the closed state to the opened state while operation of the at least one of the rail circuits is paused.

The main controller may be further configured to continue operation of the rail circuits while the input voltage supplied to the first rail circuit and the input voltage supplied to the second rail circuit are in-phase when the mains supply is a single-phase mains supply and while the input voltage supplied to the first rail circuit and the input voltage supplied to the second rail circuit are out-of-phase when the mains supply is a multi-phase mains supply.

The OBC may further include a third rail circuit and a second relay. The third rail circuit has a third rail controller configured to generate a third detection signal based on voltage events of an input voltage supplied to the third rail circuit. The second relay is switchable between (i) an opened state in which the second relay disconnects the first and third rail circuits whereby the first and third rail circuits are configured to respectively receive first and third phase input voltages from a multi-phase mains supply and (ii) a closed state in which the second relay connects the first and third rail circuits whereby the first and third rail circuits are configured to both receive a same input voltage from a single-phase mains supply. The main controller is further configured to determine from a comparison of the first detection signal at the given time and the third detection signal at the given time whether the input voltage supplied from the mains supply to the first rail circuit and an input voltage supplied from the mains supply to the third rail circuit are out-of-phase (e.g., phase offset of 120° or 240°) or in-phase to determine therefrom whether the mains supply is a three-phase or single-phase mains supply and/or whether the second relay is properly or improperly positioned in the opened state or in the closed state.

The main controller may be further configured to pause operation of at least one of the rail circuits upon at least two of the input voltages supplied to the rail circuits being in-phase when the mains supply is a three-phase mains supply and at least one of the relays is improperly in the closed state. The main controller may be further configured to retry the at least one of the relays to switch from the closed state to the opened state while operation of the at least one of the rail circuits is paused.

The main controller may be further configured to continue operation of the rail circuits while the input voltages supplied to the rail circuits are in-phase when the mains supply is a single-phase mains supply and while the input voltages supplied to the rail circuits are out-of-phase when the mains supply is a three-phase mains supply.

An associated method for use with the OBC is also provided.

BRIEF DESCRIPTION OF THE DRAWINGS

FIG. 5A illustrates a first graph having first, second, and third plots of (non-rectified) first, second, and third phase AC input voltages, a second graph having first, second, and third plots of zero-crossing event circuitry outputs of first, second, and third rail controllers based on the first, second, and third phase AC input voltages, respectively, and a third graph having first, second, and third plots of zero-crossing event timer outputs of first, second, and third rail controllers based on the first, second, and third phase AC input voltages, respectively;

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
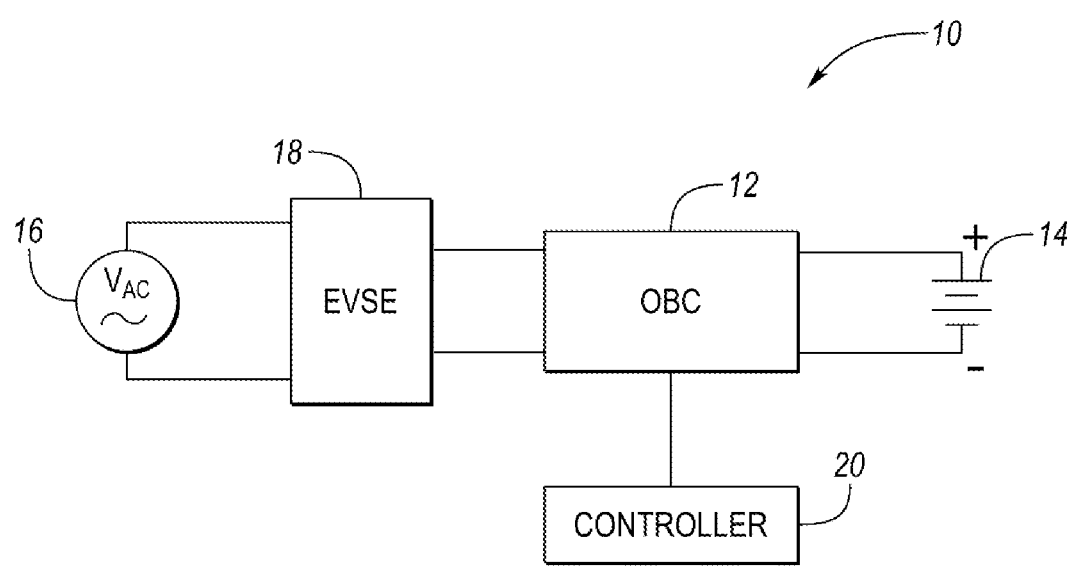
FIG. 1 illustrates a block diagram of an electrical system having a multi-phase (i.e., multi-rail), on-board battery charger (OBC)

Referring now to FIG. 1, a block diagram of an electrical system 10 having an on-board battery charger (OBC) 12 is shown. OBC 12 is "on-board" an electric vehicle (EV). The terms "electric vehicle" and "EV" herein encompass any type of vehicle which uses electrical power for vehicle propulsion including battery-only electric vehicles (BEV), hybrid electric vehicles (HEV), plug-in hybrid electric vehicles (PHEV), and the like. OBC 12 is used for charging a traction battery 14 of the EV. Traction battery 14 is a high-voltage (HV) direct current (DC) traction battery per electrical energy requirements for vehicle propulsion.

Electrical system 10 further includes an alternating current (AC) power source such as a mains supply 16 of the electrical grid. OBC 12 charges traction battery 14 using electrical power from mains supply 16. OBC 12 connects to mains supply 16 via an external Electric Vehicle Supply Equipment (EVSE) 18 to absorb electrical power from the mains supply. OBC 12 converts electrical power absorbed from mains supply 16 into DC electrical power. OBC 12 outputs the DC electrical power via a HV DC bus of the vehicle to traction battery 14 for charging the traction battery.

A main controller ("controller") 20 is associated with OBC 12. Controller 20 is an electronic device such as a processor, micro-controller, or the like (e.g., a computer) on-board the EV (e.g., a vehicle controller). Controller 20 is in communication with OBC 12 to control operations of the OBC. Controller 20 controls OBC 12 in converting electrical power from mains supply 16 into DC electrical power and in charging traction battery 14 with the DC electrical power. Controller 20 may be integrated inside the OBC unit. Controller 20 may provide general commands and communication with other vehicle units and phase (rail) dedicated controllers in charge of phase (rail) operation, control, and diagnostics in real time. Controller 20 is also operable to communicate and control other nodes of electrical system 10 and the EV including nodes involved in the charging applications.

Figure 2A:
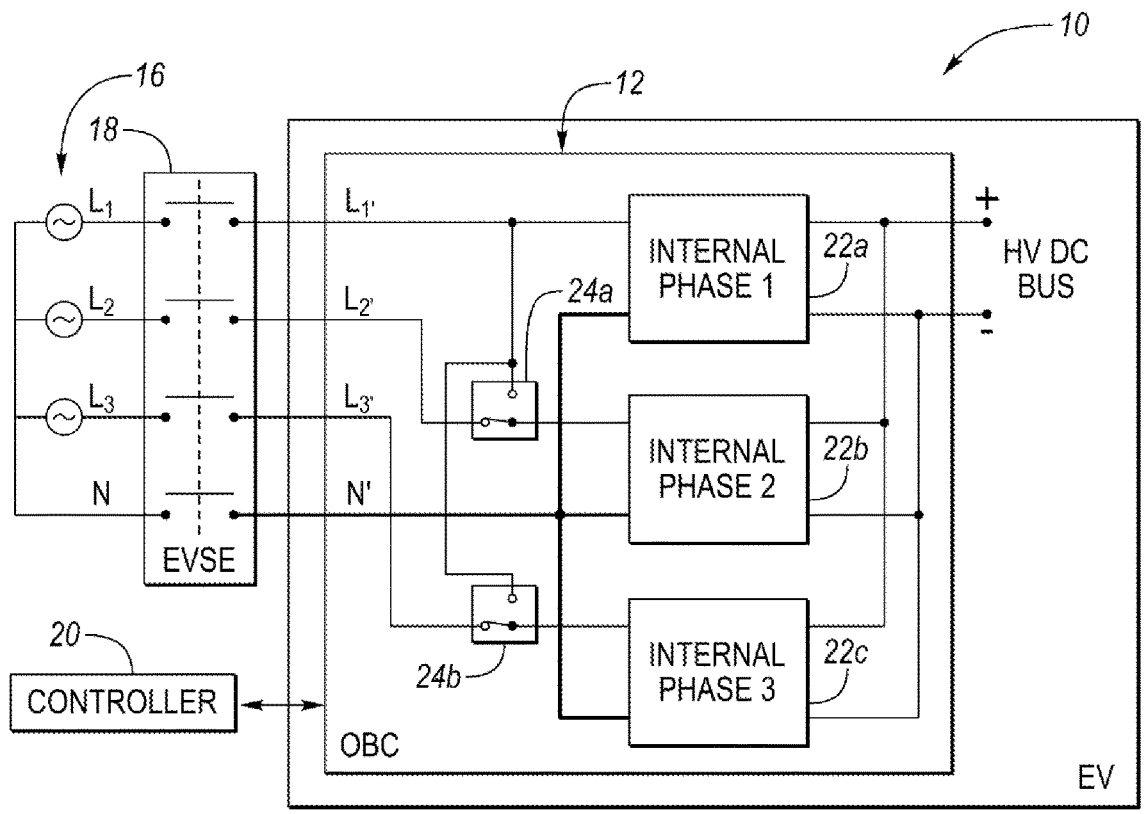
FIG. 2A illustrates a block diagram of the electrical system with a detailed depiction of the OBC as a three-phase (i.e., multi-rail) OBC having three phases (i.e., rails) and further having input relays between the rails and with a mains supply of the electrical system being a three-phase mains supply.
Figure 2B:
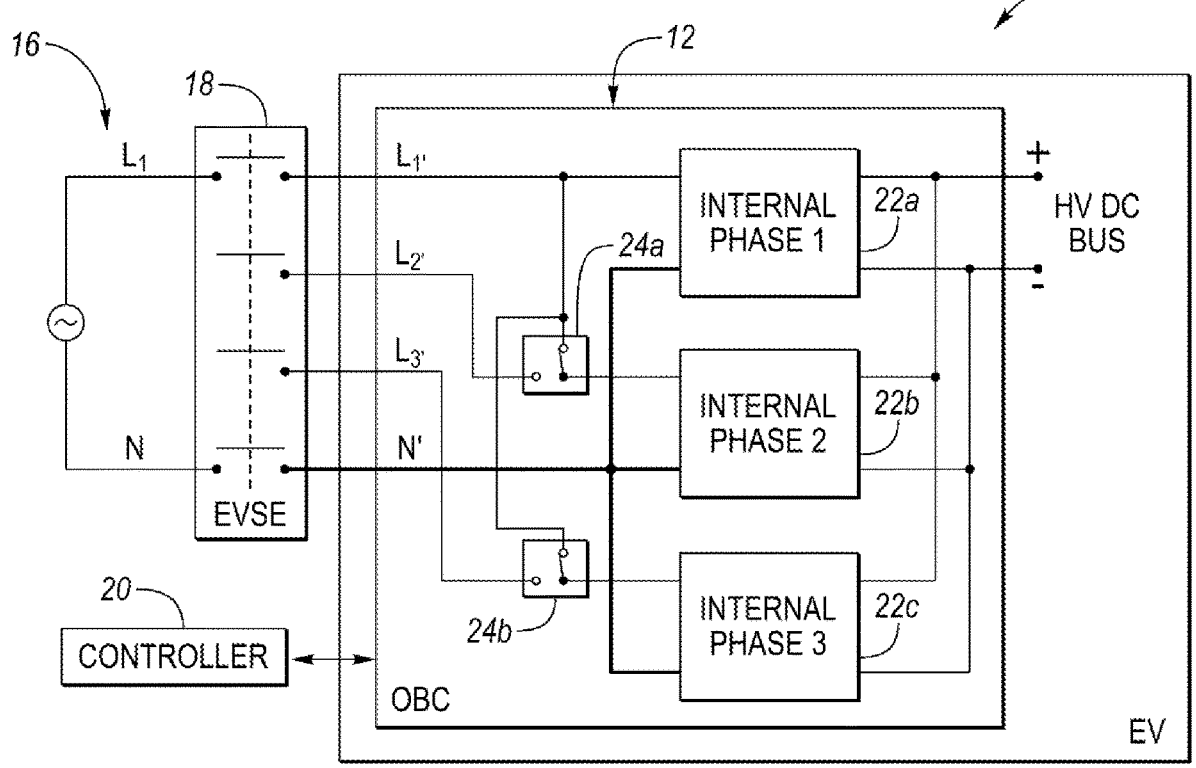
FIG. 2B illustrates a block diagram of the electrical system as shown in FIG. 2A, but with the mains supply being a single-phase mains supply.

Referring now to FIGS. 2A and 2B, with continual reference to FIG. 1, a block diagram of electrical system 10 with a detailed depiction of OBC 12 is shown. OBC 12 is a N-phase (i.e., N-rail) OBC, where N is an integer greater than one. As such, OBC 12 is a multi-phase (i.e., multi-rail) OBC having at least two phases (i.e., rails (or branches)). For example, as shown in FIGS. 2A and 2B, OBC 12 is a three-phase (i.e., three-rail) OBC having first, second, and third rails 22a, 22b, and 22c (collectively, "rails 22") (each labeled "Internal Phase" in FIGS. 2A and 2B).

Rails (i.e., rail circuits) 22 have the same electrical circuitry for converting electrical power from mains supply 16 into DC electrical power for charging traction battery 14. For example, each rail 22a, 22b, and 22c has an AC electromagnetic interference (EMI) input filter followed serially by a power factor corrector (PFC), a DC link capacitor, a DC/DC converter, and an output filter (not shown). Controller 20 in conjunction with rail controllers (discussed below) of rails 22 controls the operation of the electrical circuitry of rails 22 in converting electrical power from mains supply 16 into DC electrical power and in delivering the DC electrical power to traction battery 14. More particularly, in embodiments, a "Main Controller" is internal to the OBC and three "internal phase controllers" (or "rail controllers") are respectively associated with the three rails 22. The combination of these four controllers may be understood as providing the "controller" functionality.

Each rail 22a, 22b, and 22c is to be connected to mains supply 16 via EVSE 18 for that rail to absorb electrical power from the mains supply and to convert the absorbed electrical power into DC electrical power for charging traction battery 14. Rails 22 are between the input of the OBC, which connects to mains supply 16 via EVSE 18, and the output of the OBC, which connects to traction battery 14 via the HV DC bus of the vehicle.

Strictly as an example, each rail 22a, 22b, and 22c can deliver 3.6 kW of electrical power for charging traction battery 14. As such, in this example, OBC 12 can deliver 10.8 kW (3*3.6 kW) of electrical power for charging traction battery 14 (i.e., in this example, OBC 12 is a "11 kW" OBC).

OBC 12 further includes input relays (or switches) 24a and 24b (collectively, "input relays 24"). Input relay 24a is between the inputs of rails 22a and 22b. Input relay 24b is between the inputs of rails 22a and 22c. Each input relay 24a and 24b is switchable between opened and closed states. Controller 20 is operable to control the switching of input relays 24.

A closed input relay connects the inputs of the two rails that the input relay is between. Conversely, an opened input relay disconnects the two rails that the input relay is between. Input relays 24 are both shown in FIG. 2A in an opened state (i.e., the rest position). Thus, the input of rail 22b is not connected to the input of rail 22a as input relay 24a between rails 22a and 22b is opened. Likewise, rail 22c is not connected to the input of rail 22a as input relay 24b between rails 22a and 22c is opened. Input relays 24 are both shown in FIG. 2B in a closed state. Thus, the input of rail 22b is connected to the input of rail 22a as input relay 24a between rails 22a and 22b is closed. Likewise, rail 22c is connected to the input of rail 22a as input relay 24b between rails 22a and 22c is closed.

Mains supply 16 is either a multi-phase mains supply or a single-phase mains supply. Typically, as a multi-phase mains supply, mains supply 16 is a three-phase mains supply. Input relays 24 are for use in enabling OBC 12 to be used interchangeably with a multi-phase mains supply and a single-phase mains supply.

Rail 22a individually connects directly to mains supply 16 via EVSE 18 in either case of the mains supply being multi-phase or single-phase. In the case of mains supply 16 being multi-phase, controller 20 controls input relays 24 to be opened (shown in FIG. 2A). In this case, in addition to rail 22a being individually connected directly to mains supply 16 via EVSE 18, rails 22b and 22c are also individually connected directly to the mains supply via the EVSE. In the case of mains supply 16 being single-phase, controller 20 controls input relays 24 to be closed (shown in FIG. 2B). In this case, rails 22b and 22c are combined with rail 22a to be connected with rail 22a to mains supply 16.

In FIG. 2A, mains supply 16 is a three-phase mains supply. In this case, input relays 24 are to be controlled to be open (input relays 24 are shown opened in FIG. 2A) whereby all three rails 22 may individually directly connect with mains supply 16 via EVSE 18. Particularly, each rail 22a, 22b, 22c directly connects, via respective nodes $L_{1'}$, $L_{2'}$, $L_{3'}$ of OBC 12, with a corresponding line $L_1$, $L_2$, $L_3$ of mains supply 16 and, via a neutral node N' of the OBC, with a neutral line N of the mains supply.

In FIG. 2B, mains supply 16 is a single-phase mains supply. In this case, input relays 24 are to be controlled to be closed (input relays 24 are shown closed in FIG. 2B) whereby rail 22a individually directly connects with mains supply 16 via EVSE 18 and rails 22b and 22c connect to rail 22a to connect with the mains supply. Particularly, rail 22a directly connects, via node $L_{1'}$, of OBC 12, with a corresponding line $L_1$ of mains supply 16 and, via a neutral node N' of the OBC, with a neutral line N of the mains supply; and rails 22b and 22b directly connect, via closed input relays 24a and 24b, with the node $L_{1'}$ of OBC 12 and with the neutral node N' of the OBC.

As described, OBCs for EVs that are capable to work with single-phase (1-ph) and three-phase (3-ph) AC grids with N available are usually designed with three internal rails (or modules) 22 which share the neutral node N' of the OBC. Rails 22b and 22c can switch to the $L_{1'}$ node of the OBC in the case of 1-ph AC grids. As further described, the OBCs are not directly connected to the electrical grid but are connected to the electrical grid by means of an EVSE which acts as an additional element to ensure a safe and controlled connection of the OBC to the AC grid. When both the EVSE and the OBC are ready for the charging operation, the EVSE closes its contactors and the OBC receives the AC voltage supply from the AC grid.

For reference, SAE-J1772, IEC-61851, and GB/T 20234 cover a relatively wide range of domestic networks, considering different voltage ranges, as well as different AC grid frequency or number of phases. A configurable OBC which covers all the AC grid possibilities within the same device is desirable. OBCs intended to support both single-phase and three-phase grids are generally based on internal rails (i.e., modules) which are connected accordingly to the live phases to allow their operation, as described above.

Embodiments of the present invention provide a method and system for detecting characteristics of the AC grid connected with the OBC and for diagnosing the input relays (or switches) of the OBC involved with the multi-phase vs. single-phase configuration for the OBC (i.e., multi-rail vs. single-rail configuration for the OBC). That is, embodiments of the present invention provide a method and system for detecting phase (i.e., rail) configuration of a mains supply to which the OBC is connected and for diagnosing operational status of the input relays of the OBC used for implementing the phase configuration of the OBC to be compatible with whether the mains supply is multi-phase or single-phase.

For further reference, most EVSEs are not prepared to communicate to the OBC which kind of grid (multi-phase mains supply vs. single-phase mains supply) that will be supplying AC electrical power to the OBC. Hence, in accordance with embodiments of the present invention, the OBC is configured to identify the type of grid supplying AC electrical power to the OBC and is configured to make the rails of the OBC switch in correspondence with the AC voltage present at the input of the OBC. In accordance with embodiments of the present invention, the OBC is further configured with a mechanism to diagnose the integrity of the input relays of the OBC, which allow the rails of the OBC to commute from one rail to another, in order to determine which rails of the OBC and which corresponding input relays of the OBC are in proper condition to process power. A less cost-effective solution to diagnose the integrity of the input relays is to use a specific circuit exclusively dedicated for such purposes.

In sum, in accordance with embodiments of the present invention, the OBC has the following features: the OBC is able to charge from both 3-phase and 1-phase grids; the OBC can detect the AC grid connected thereto and ensure proper voltage supply; the OBC can then switch the internal configuration relays accordingly; and the OBC can ensure that the relays work properly before the charging process activation. In having these features, the OBC is able to diagnose both the AC-grid and the relays.

Figure 3:
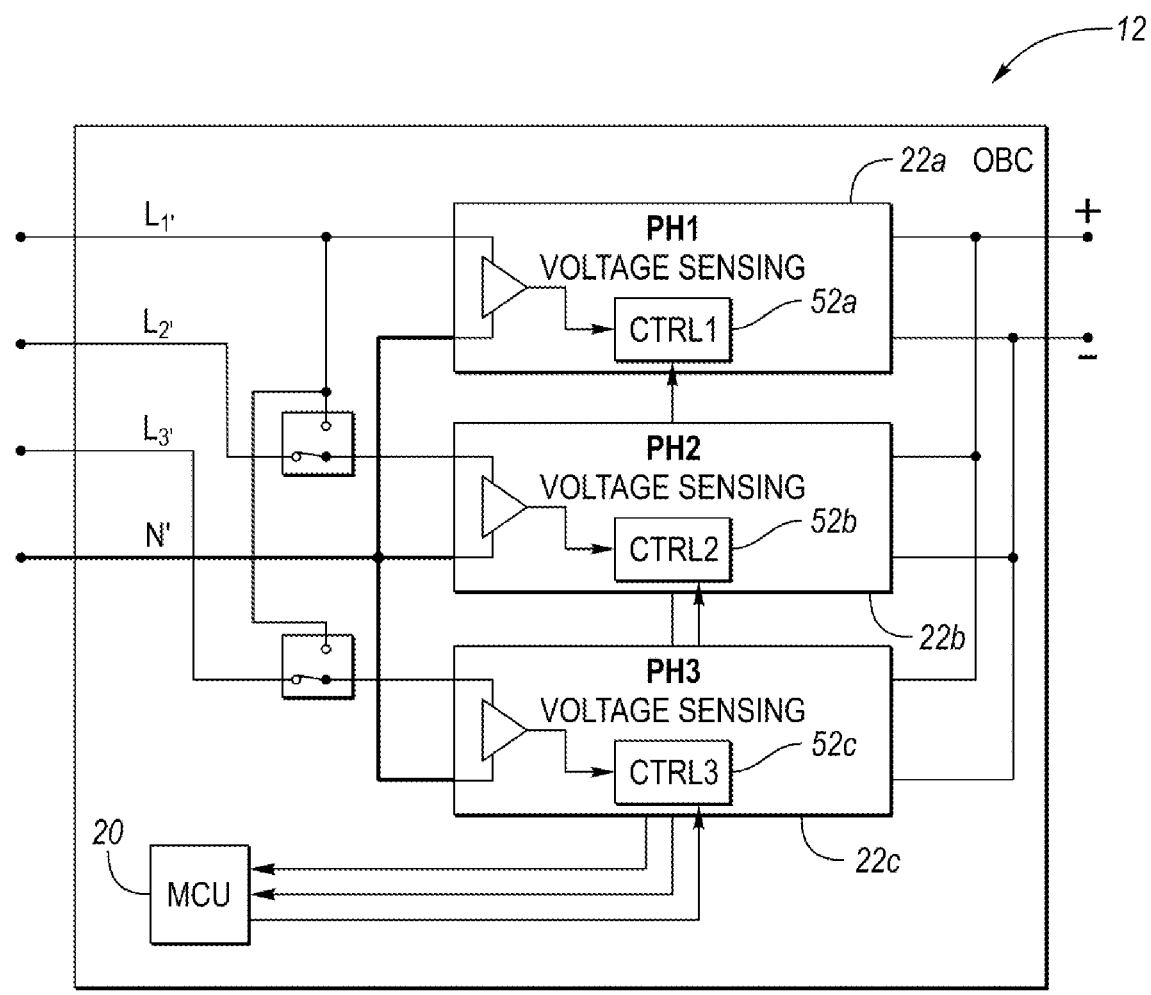
FIG. 3 illustrates a block diagram of the OBC with a depiction of individual rail controllers of the rails of the OBC and their communicative arrangement with a main controller of the OBC.

Referring now to FIG. 3, with continual reference to FIGS. 1, 2A, and 2B, a block diagram of OBC 12 is shown. Because of cost and to respect functional isolation between rails 22 of OBC 12, each rail 22 is generally controlled by its own independent controller 52 which only sees what is happening on its own rail. The individual controllers 52a ("CTRL1"), 52b ("CTRL2"), 52c ("CTRL3") (collectively, "rail controllers 52") of rails 22a, 22b, 22c, respectively, of OBC 12 and their communicative arrangement with controller 20 of the OBC are shown in the block diagram of FIG. 3.

In accordance with embodiments of the present invention, rail controllers 52 are used to detect and measure the AC voltage and frequency at the inputs of rails 22 of OBC 12. That is, rail controller 52a is used to detect and measure the AC voltage and frequency at the input of rail 22a; rail controller 52b is used to detect and measure the AC voltage and frequency at the input of rail 22b; and rail controller 52c is used to detect and measure the AC voltage and frequency at the input of rail 22c. (As an alternative, a saw-tooth analog signal could be generated and sent directly to controller 20, instead of having the rail controllers counting and digitally providing only the instant input phase value at the request of controller 20. However, this would increase the number of hardware components and circuit dimensions.)

In operation, rail controllers 52 transfer this information (i.e., analog or digital signal sharing) to the general OBC supervisor MCU (i.e., controller 20). Controller 20 is also the controller that is responsible for commanding rail controllers 52 what to do. Controller 20 is further responsible to identify those rails and their corresponding relays that are in proper condition to process power. For such diagnostics, as phase difference is the only way to generally differentiate $L_1$, $L_2$, and $L_3$ of OBC 12, it is helpful to know the phase-shift of each input phase voltage with respect to the other input phase voltages (e.g., helpful to know whether the input voltage of rail 22b is offset by 0°, 120°, or some other degree amount, with respect to the input voltage of rail 22a; helpful to know whether the input voltage of rail 22c is offset by 0°, 120°, or some other degree amount, with respect to the input voltage(s) of rails 22a and/or 22b; etc.).

For this, each rail controller 52 manages an internal counter which keeps increasing until that rail controller detects a zero-cross voltage event of the input voltage of the corresponding rail. At the moment that a rail controller 52 detects a zero-cross voltage event that rail controller restarts its counter to zero. That is, rail controller 52a increases its counter until rail controller 52a detects a zero-cross voltage event of the input voltage of rail 22a at which time rail controller 52a restarts its counter to zero; rail controller 52b increases its counter until rail controller 52b detects a zero-cross voltage event of the input voltage of rail 22b at which time rail controller 52b restarts its counter to zero; and rail controller 52c increases its counter until rail controller 52c detects a zero-cross voltage event of the input voltage of rail 22c at which time rail controller 52c restarts its counter to zero. In this way, rail controllers 52 function as phase detectors.

Controller 20 generates a simultaneous request to all rail controllers 52 asking the rail controllers to provide their counter values at a certain moment to controller 20. Controller 20 processes the counter values to determine what (if any) input voltage phase shift is present between rails 22.

Using zero-cross voltage events of the input voltages is one way of synchronizing measurements. Other ways include, for example, using peak voltage detection of the input voltages. In general, any type of threshold detection can be used. That is, any means which can differentiate the input voltages from one another can be used. So, as the magnitude values of the input voltages are the same (or at least substantially the same), any phase differentiating function could be considered in this stage.

Herein, as an example, a "time-voltage" measurement is described. In this case, controller 20 gives the time (i.e., generates a triggering event) and rail controllers 52 provide their measured values of the input voltages. From a comparison of the measured values of the input voltages at the triggering time, controller 20 is able to discern the phase differences (if any) between the input voltages.

As described herein, each rail controller 52 generates its measured value of the input voltage from a counter synchronized with zero-crossing. However, other means to provide a voltage related with phase differences is possible, like peak detection or any other threshold voltage detection. Another possibility could be to use a central timer and then each rail controller provides the zero-crossing time to controller 20 which would evaluate the time differences. Or second and third rail controllers 52b and 52c could directly provide a phase difference to controller 20, based in a difference of times between their measurement and the measurement from rail controller 52a; etc.

Figure 4:
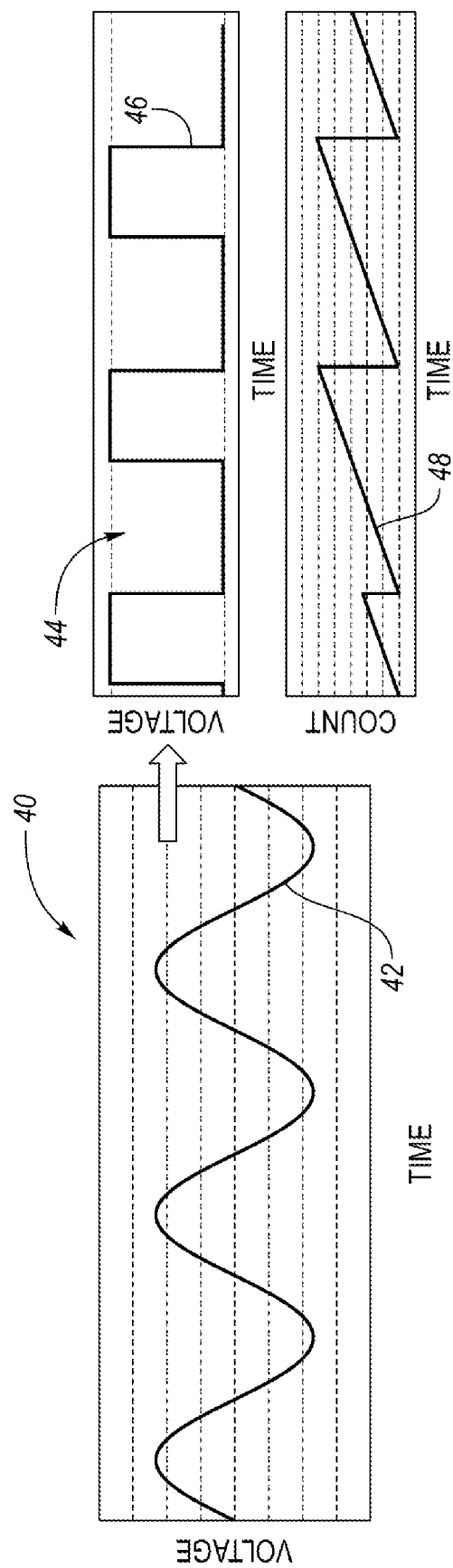
FIG. 4 illustrates a first graph having a plot of an AC input voltage and a second graph having a first plot of zero-crossing event circuitry output of a rail controller based on the AC input voltage and a second plot of zero-crossing event timer output of a rail controller based on the AC input voltage.

Referring now to FIG. 4, with continual reference to FIG. 3, a first graph 40 having a plot 42 of an AC input voltage supplied to a rail 22 of OBC 12 and a second graph 44 having a plot 46 of zero-crossing voltage event circuitry output of rail controller 52 of the rail based on the AC input voltage and a plot 48 of zero-crossing voltage event timer output of the rail controller based on the AC input voltage are shown. Each rail controller 52 is operable to measure the frequency of the AC grid (i.e., the frequency of the AC input voltage received by the rail 22 of which the rail controller 52 belongs) by using zero-crossing voltage event circuitry, as indicated by plot 46, and/or by using a zero-crossing voltage event timer (i.e., the internal counter) to determine the time expired (e.g., the phase evolution or the phase vs. time evolution as it is the phase that is being controlled) since the last zero-crossing voltage event, as indicated by plot 48. (In sum, a rail controller only has data indicating the zero-crossing occurrences. Then the counter is increased a known amount at given intervals (until next reset).) As described and as illustrated, FIG. 4 is a one-phase graphic example.

By converting the phase to a voltage value, the three phase values of the three rail circuits 22 may be compared with one another by main controller 20 to determine the amount of phase shift, if any, between the input voltages respectively received by rail circuits 22.

FIG. 5A illustrates graphs corresponding to the graphs shown in FIG. 4 for a three-phase graphic example based on non-rectified AC input voltages. Particularly, FIG. 5A illustrates a first graph 60 having first, second, and third plots 62a, 62b, 62c of non-rectified, first, second, and third phase AC input voltages received by first, second, and third rails 22a, 22b, 22c, a second graph 64 having first, second, and third plots 66a, 66b, 66c of zero-crossing voltage event circuitry outputs of first, second, and third rail controllers 52a, 52b, 52c based on the first, second, and third phase AC input voltages, respectively, and a third graph 68 having first, second, and third plots of zero-crossing voltage event timer outputs 70a, 70b, 70c of first, second, and third rail controllers 52a, 52b, 52c based on the first, second, and third phase AC input voltages, respectively. Rail controllers 52a, 52b, 52c are operable to measure the frequency of the AC grid (i.e., the frequency of the first, second, and third phase AC input voltages) by using zero-crossing voltage event circuitry, as indicated by plot 64, and/or by using the zero-crossing voltage event timer (i.e., the internal counter) to determine the time expired since the last zero crossing voltage event, as indicated by plot 68.

Figure 5B:
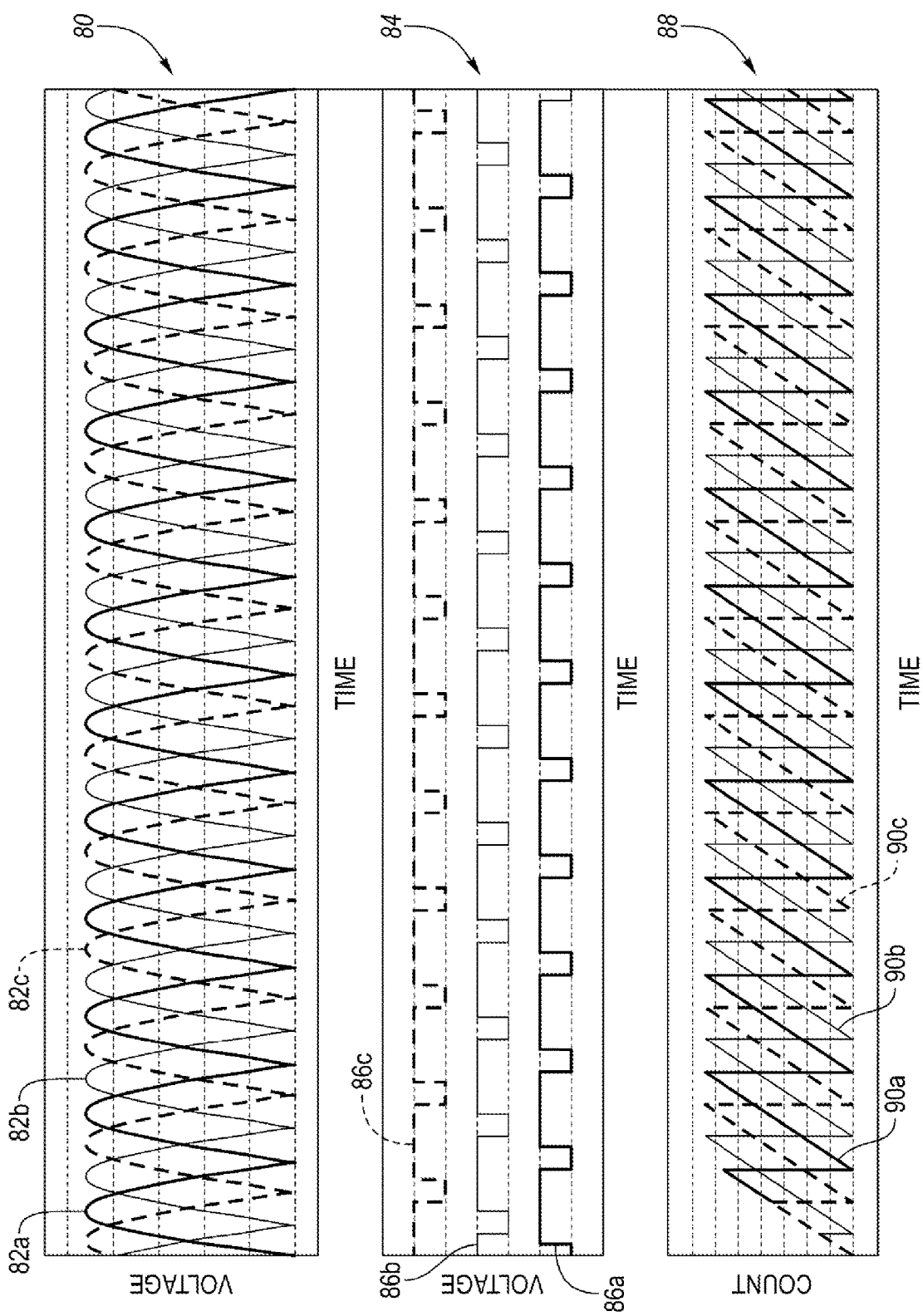
FIG. 5B illustrates a first graph having first, second, and third plots of (rectified) first, second, and third phase AC input voltages, a second graph having first, second, and third plots of zero-crossing event circuitry outputs of first, second, and third rail controllers based on the first, second, and third phase AC input voltages, respectively, and a third graph having first, second, and third plots of zero-crossing event timer outputs of first, second, and third rail controllers based on the first, second, and third phase AC input voltages, respectively.

FIG. 5B illustrates graphs corresponding to the graphs shown in FIG. 4 for a three-phase graphic example based on rectified AC input voltages. (This example with "rectified" AC input voltages is to describe the case when the measurements done by the rail controllers are after the rectifier stage, the first step at each OBC rail.) Particularly, FIG. 5B illustrates a first graph 80 having first, second, and third plots 82a, 82b, 82c of rectified, first, second, and third phase AC input voltages, a second graph 84 having first, second, and third plots 86a, 86b, 86c of zero-crossing voltage event circuitry outputs of first, second, and third rail controllers 52a, 52b, 52c based on the first, second, and third phase AC input voltages, respectively, and a third graph 88 having first, second, and third plots of zero-crossing voltage event timer outputs 90a, 90b, 90c of first, second, and third rail controllers 52a, 52b, 52c based on the first, second, and third phase AC input voltages, respectively. Rail controllers 52a, 52b, 52c are operable to measure the frequency of the AC grid (i.e., the frequency of the first, second, and third phase AC input voltages) by using zero-crossing voltage event circuitry, as indicated by plot 84, and/or by using the zero-crossing voltage event internal timer (i.e., the internal counter) to determine the time expired since the last zero-crossing voltage event, as indicated by plot 88.

Figure 6:
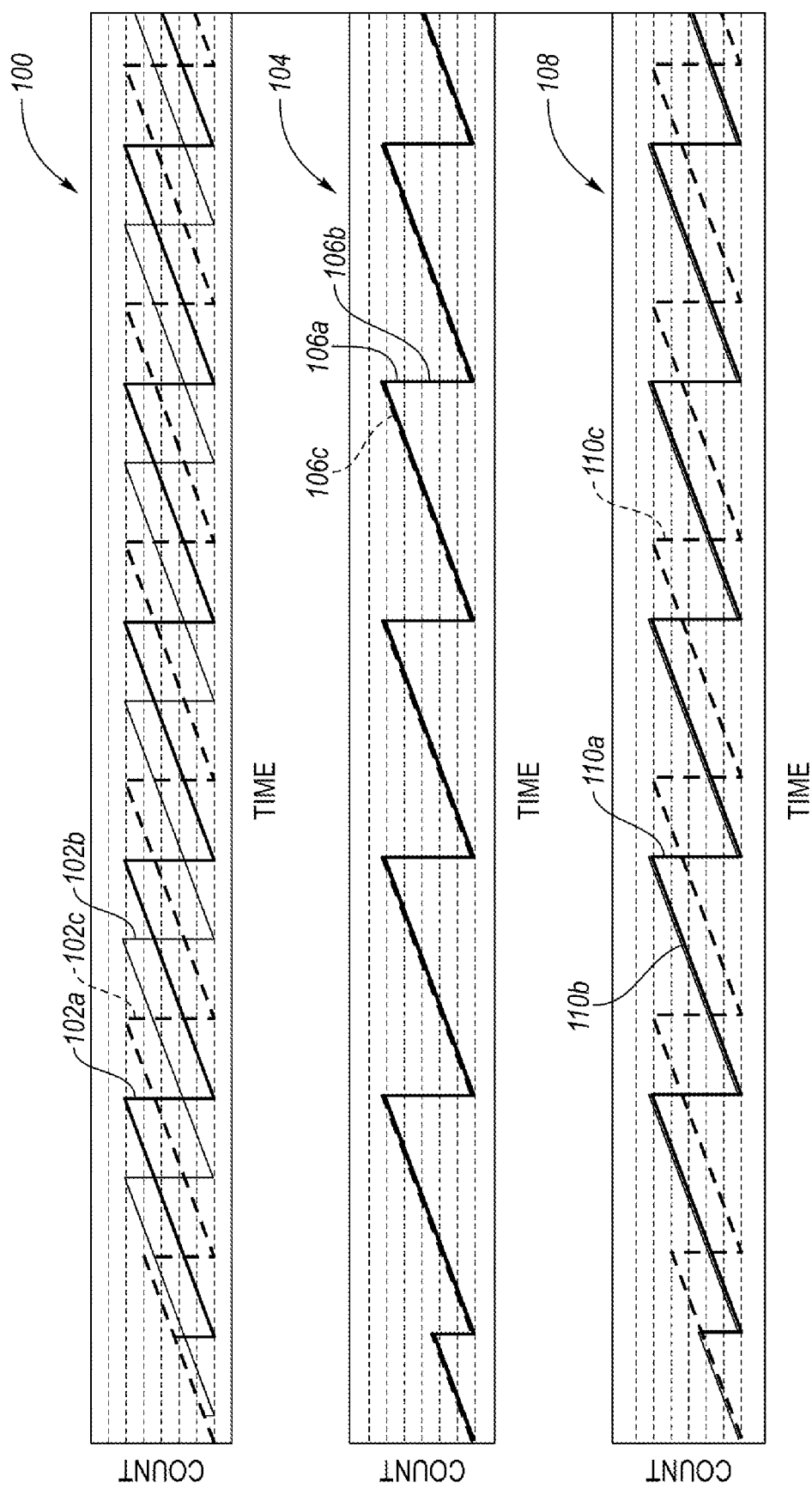
FIG. 6 illustrates a first graph of first, second, and third plots of zero-crossing event timer outputs of first, second, and third rail controllers based on (non-rectified) first, second, and third phase AC input voltages supplied to the OBC from a three-phase mains supply when the relays of the OBC are properly positioned in their opened position (i.e., their rest position) whereby the rails of the OBC are properly individually directly connected to the OBC; a second graph of first, second, and third plots of zero-crossing event timer outputs of first, second, and third rail controllers based on a (non-rectified) AC input voltage supplied to the OBC from a single-phase mains supply when the relays of the OBC are properly positioned in their closed position whereby the rails of the OBC are properly connected as a single entity to the OBC; and a third graph of first, second, and third plots of zero-crossing event timer outputs of first, second, and third rail controllers based on (non-rectified) first, second, and third phase AC input voltages supplied to the OBC from a three-phase mains supply when (i) the first input relay of the OBC is improperly positioned in its closed position whereby the second rail of the OBC is improperly connected with the first rail of the OBC as single entity to the OBC and (ii) the second input relay of the OBC is properly positioned in its opened position whereby the third rail of the OBC is properly individually connected to the OBC.

FIG. 6 illustrates a first graph 100 of first, second, and third plots 102a, 102b, 102c of zero-crossing voltage event timer outputs of first, second, and third rail controllers 52a, 52b, 52c based on (non-rectified) first, second, and third phase AC input voltages supplied to OBC 12 from three-phase mains supply 16 when relays 24a and 24b of the OBC are properly positioned in their opened position (i.e., their rest position) whereby rails 22a, 22b, 22c of the OBC are properly individually connected to the $L_1$, $L_2$, $L_3$ inputs of the OBC.

FIG. 6 further illustrates a second graph 104 of first, second, and third plots 106a, 106b, 106c of zero-crossing voltage event timer outputs of first, second, and third rail controllers 52a, 52b, 52c based on a (non-rectified) AC input voltage supplied to OBC 12 from single-phase mains supply 16 when relays 24a and 24b of the OBC are properly positioned in their closed position whereby rails 22a, 22b, 22c of the OBC are properly connected as a single entity to the $L_1$, input of the OBC.

FIG. 6 further illustrates a third graph 108 of first, second, and third plots 110a, 110b, 110c of zero-crossing voltage event timer outputs of first, second, and third rail controllers 52a, 52b, 52c based on (non-rectified) first, second, and third phase AC input voltages supplied to OBC 12 from three-phase mains supply 16 when (i) first input relay 24a of the OBC is improperly positioned in its closed position whereby second rail 22b of the OBC is improperly connected with first rail 22a of the OBC as a single entity to the $L_1$, input of the OBC and (ii) second input relay 24b of the OBC is properly positioned in its opened position whereby third rail 22c of the OBC is properly individually connected to the $L_3$, input of the OBC.

The information of first, second, and third plots of zero-crossing voltage event timer outputs of first, second, and third rail controllers 52a, 52b, 52c, such as shown in each of graphs 100, 104, and 108, are used by controller 20, in accordance with embodiments of the present invention, for detecting phase configuration of mains supply 16 to which the OBC is connected and for diagnosing operational status of input relays 24a and 24b, which are used for changing the phase (i.e., rail) configuration of the OBC to be compatible with whether the mains supply is multi-phase or single-phase.

In operation, controller 20 receives voltage values according to the zero-crossing voltage event timer outputs of rail controllers 52. The plots of the zero-crossing voltage event timer outputs shown in each of graphs 100, 104 and 108 are graphical examples, as previously indicated. With these three possible examples of measurements shown by graphs 100, 104, and 108, controller 20 will receive either voltage values corresponding to plots 102a, 102b, and 102c of graph 100, voltage values corresponding to plots 106a, 106b, 106c of graph 104, or voltage values corresponding to plots 110a, 110b, and 110c of graph 108. Controller 20 uses the received voltage values to detect phase differences (if any) between the input voltages of rails 22.

Particularly, the information of zero-crossing voltage event timer outputs of first, second, and third rail controllers 52a, 52b, 52c indicates the time expired from the last zero-crossing voltage event on rails 22a, 22b, 22c. With this information, controller 20 can determine whether the AC input voltages connected to rails 22a, 22b, 22c are: (i) all out of phase with one another by 120° according to mains-supply 16 being a three-phase mains supply—which is the situation represented by graph 100—and the controller can thereby determine that rails 22a, 22b, and 22c are operating properly with a three-phase mains supply; (ii) all have the same phase according to the mains-supply being a single-phase mains supply—which is the situation represented by graph 104—and the controller can thereby determine that rails 22a, 22b, and 22c are operating properly with a single-phase mains supply; or (iii) mixed such as with two input voltages having the same phase and the remaining input voltage having a different phase (i.e., the remaining input voltage being out of phase with the other two input voltages by 120° or) 240°)—which is the situation represented by graph 108—and the controller can thereby determine that rails 22a and 22c are operating properly with a three-phase mains supply but that rail 22b is operating improperly with the three-phase mains supply and thereby identify this situation as being faulty. (Of course, in the case of graph 100, with a three-phase input, any non—120° difference between phases could be detected, then, indicating an anomaly in the supplied input voltage signals. That could also trigger the respective OBC corrective actions (for example disconnection and information of system stop due to input voltage anomaly).)

Considering the graphs having the plots of the zero-crossing voltage event circuitry outputs and the zero-crossing voltage event timer outputs of the rail controllers described above, generally, controller 20 needs a way to detect phase differences. One option would be using an optocoupler to directly feed controller 20 with the mentioned voltage events. However, this solution is not effective in terms of cost as optocouplers are relatively expensive and is not effective in terms of CPU load as controller 20 would have three ports connected to ports with external interrupt capability and should process many interrupts. (There could be two alternatives. First, controller 20 receives the zero-crossing voltage events from all three rails 22 and then respectively synchronizes three internal timers. At the desired moment the three timers are read and compared. Second, controller 20 receives the saw-tooth signals from all three rails 22 and at a given time converts each into a digital value. That would require three analog-to-digital converters (ADCs). In both cases there are extra electronic components (to generate, isolate, and keep the signals clean up to controller 20). Either timers or ADCs are resources dedicated in controller 20, with respective processing load.)

Embodiments of the present invention provide an alternative solution by using the measurement synchronization of zero-crossing voltage events by the use of rail controllers 52 which are in communication with controller 20. In operation, controller 20 generates a simultaneous query to each of rail controllers 52a, 52b, 52c for the expired time since the last zero-crossing voltage event. Controller 20 determines what, if any, time difference exists between the expired times to determine whether the AC input voltage connected to each rail is the expected one or whether there is some problem with the relay managing the single/multi-phase configuration of OBC 12.

For instance, from the expired time information provided by rail controllers 52a, 52b, 52c, controller 20 can determine whether the expired times have a difference between them as expected when OBC 12 is operating properly in receipt of first, second, and third phase AC input voltages from a three-phase mains supply (the situation represented by graph 100 of FIG. 6); whether the expired times have no difference between them as expected when OBC 12 is operating properly in receipt of a single-phase AC input voltage from a single-phase mains supply (the situation represented by graph 104 of FIG. 6); whether two expired times have a difference between them and the remaining expired time has no difference with one of the two expired times as expected when there is the corresponding faulty condition when OBC 12 is not operating properly in receipt of first, second, and third phase AC input voltages from a three-phase mains supply (the situation represented by graph 108 of FIG. 6); etc.

As described, in accordance with the algorithm employed by OBC 12, main controller 20 is able to compare the phases the input voltage received by each rail 22 while monitoring the status of relays 24. Phase shifts are verified by main controller 20 comparing, for example, the three saw-tooth signals such as shown in FIG. 6. (The plots shown in FIG. 6 are graphic examples. Controller 20 receives voltages corresponding to the plots from rail controllers 52. From these received voltages and from knowing the range of voltages in the zero-crossing voltage event timers, controller 20 may calculate the phase differences.) Main controller 20 operates relays 24 and compares the input voltage signals as a means to verify proper operation of relays 24 before and after the charging.

Referring now to FIG. 7A and FIGS. 7B, 7C, and 7D, with reference to the preceding Figures, a block diagram of OBC 12 and a flowchart 110 depicting operation of a method and system in accordance with embodiments of the present invention are respectively shown. The block diagram of OBC 12 in FIG. 7A includes a depiction of first rail controller 52a of first rail 22a of the OBC and an nth rail controller 52n of an nth rail 22n of the OBC. The operation illustrated in flowchart 110 of FIGS. 7B, 7C, and 7D includes steps for controller 20 detecting phase configuration of mains supply 16 to which OBC 12 is connected and includes steps for controller 20 diagnosing operational status of input relays 24 which are used for changing the phase (i.e., rail) configuration of the OBC to be compatible with whether the mains supply is multi-phase or single-phase.

Figure 7A:
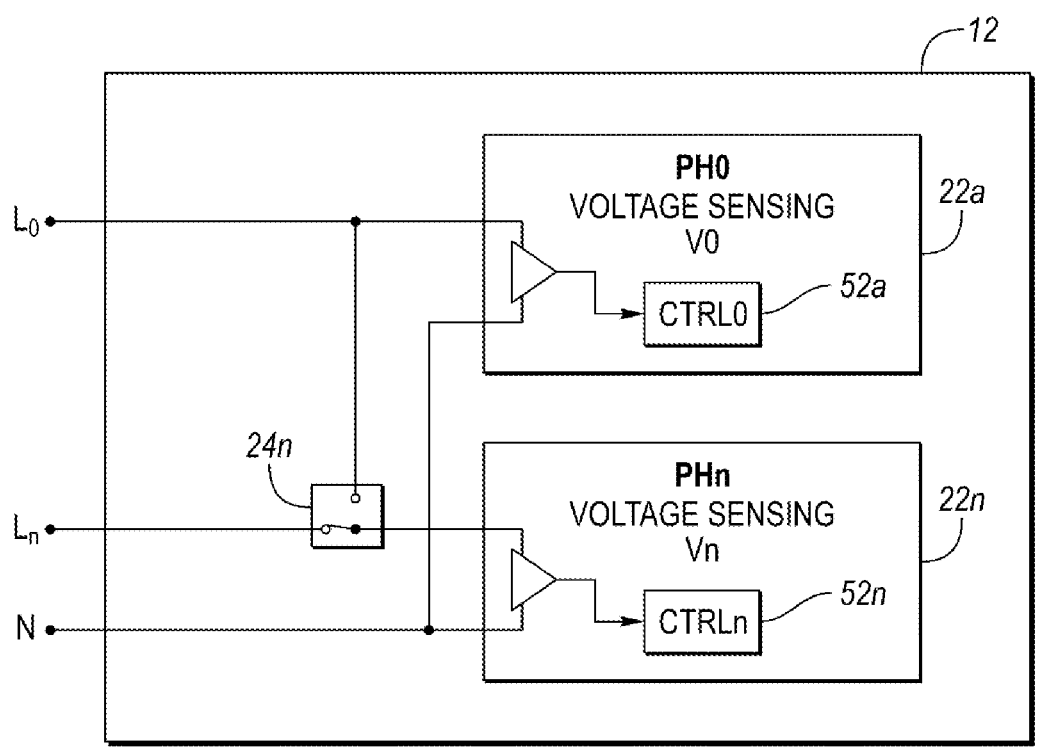
FIG. 7A illustrates a block diagram of the OBC with a depiction of a first rail controller of a first rail of the OBC and an $n^{th}$ rail controller of an $n^{th}$ rail of the OBC.
Figure 7B:
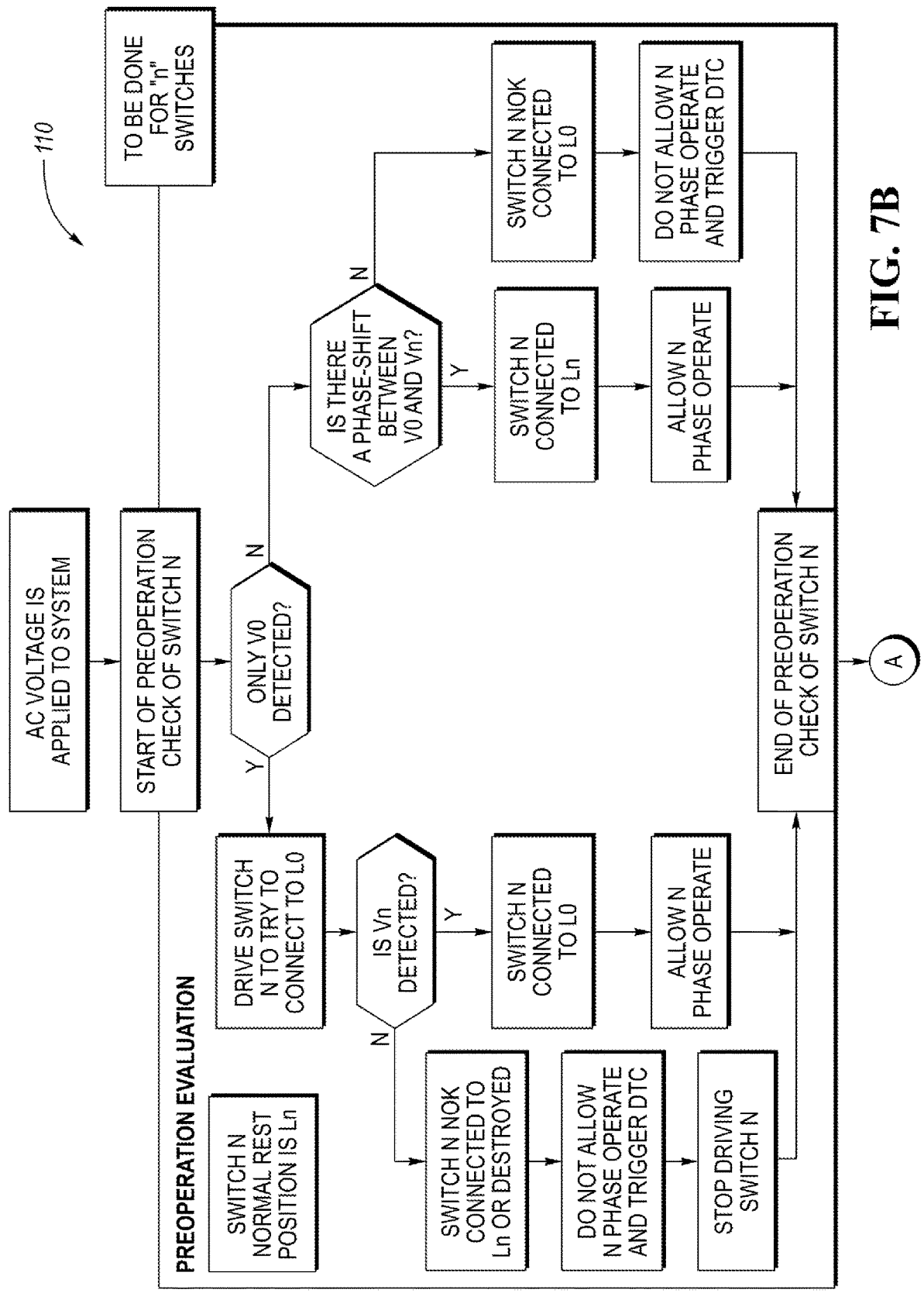
FIGS. 7B, 7C, and 7D illustrate a flowchart depicting operation of a method and system for detecting phase configuration of the mains supply to which the OBC is connected and for diagnosing operational status of the input relays of the OBC which are used for changing the phase (i.e., rail) configuration of the OBC to be compatible with whether the mains supply is multi-phase or single-phase.
Figure 7C:
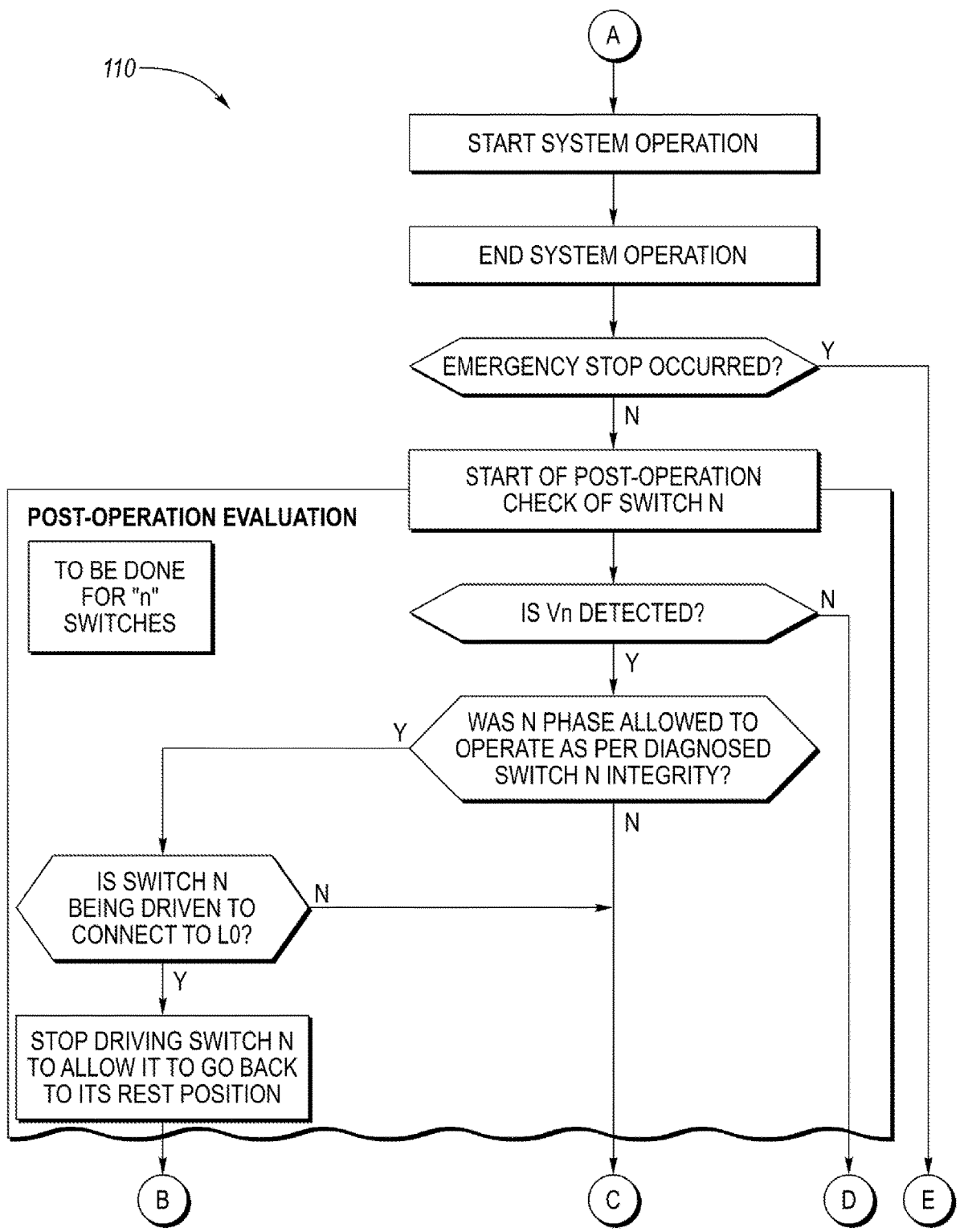
Figure 7D:
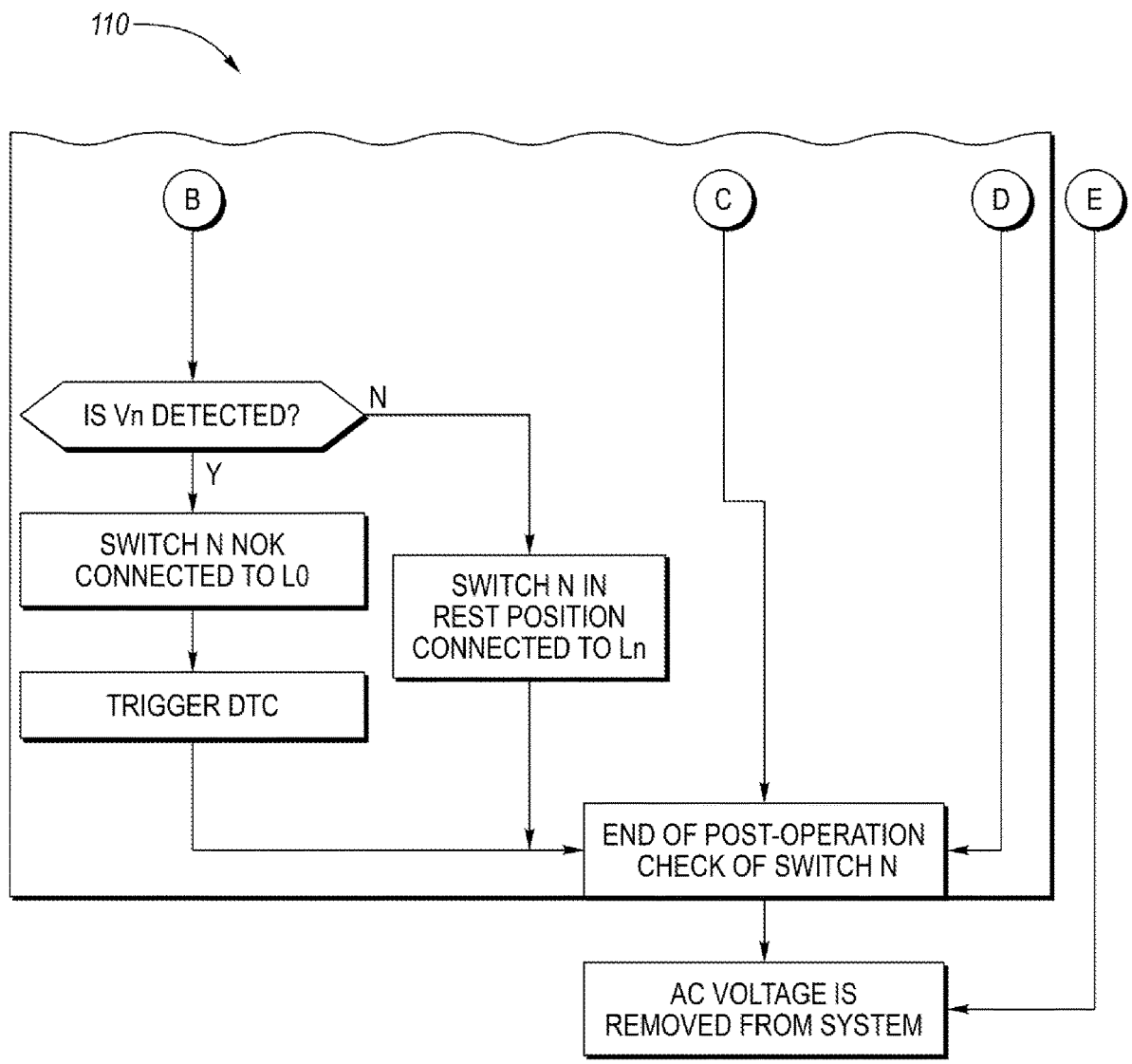

Note that as shown in FIG. 7A, each input relay 24 of OBC 12 is normally in its opened position in which each of the associated pair of rail circuits 22 may be individually directly connectable to corresponding lines of a multi-phase mains supply. Each of the associated pair of rail circuits 22 would thereby receive an input voltage from the multi-phase mains supply. If, however, the mains supply is a single-phase mains supply, then at least one of the associated pair of rail circuits could not be individually directly connected to the mains supply as the mains supply, being single-phase, would lack the corresponding lines. As such, in this case, the at least one of the associated pair of rail circuits would then not receive an input voltage from the mains supply. Controller 20 can detect this with the information provided by the associated rail controllers and thereby realize that the mains supply is a single-phase mains supply. In turn, controller 20 controls the input relays 24 to move to the closed position, which causes OBC 12 to conform to the single rail configuration in line with the mains supply being single phase. (This verification is also done at charging process completion, when relays 24 are turned to the OFF state and a verification is done to confirm such change in case of being supplied from a single-phase grid.)

As described, in accordance with embodiments of the present invention, the OBC controllers at each internal rail which already sense the respective input voltage signals are employed with an input signal phase detection algorithm that is synchronized by the input voltage zero crossing. The main controller compares the phases at the respective rails and diagnoses the AC grid input and the internal relay system based on the comparison.

As described, many OBCs are to be operable with 1-ph and 3-ph types of grids. A common approach is to design the OBCs with internal rails capable of switching between multi-phase (i.e., multi-rail) configuration and single-phase (i.e., single rail) configuration by means of power switches (i.e., the input relays). A smart strategy to check integrity of the power switches is necessary and is provided by embodiments of the present invention. Embodiments of the present invention implement the integrity check by using software in the OBC digital controllers (i.e., the rail controllers) and in the MCU (i.e., the main controller). Embodiments of the present invention thereby avoid the use of optocouplers that provide the input voltages of the rails of the OBC to the MCU.

As described, a brief description of embodiments of the present invention includes AC-input multi-phase detection and diagnostics including input configuration relays, taking advantage of existing hardware. New features of embodiments of the present invention include, at each OBC rail, the AC-input phase being converted to a voltage value and sent to the main controller; the main controller is then able to differentiate the phase differences and diagnose the AC-input and the internal configuration status of the relays. A problem solved by embodiments of the present invention includes diagnosis of AC-input phases including internal input-configuration relays. A technology to which embodiments of the present invention provide an improvement over includes sensing the AC-inputs directly by the main microcontroller; this may mean the addition of voltage sensing interfaces including optocouplers as main controller (at 12V domain) has to be isolated from AC inputs domain.

Further, other methods, voltage events, or reference points different than zero-cross voltage events described herein can be used for determining the phase shift between input voltages of the rail circuits. For instance, peak voltage detection of the input voltages supplied to the rail circuits can be used for determining the phase shifts between the input voltages.

While exemplary embodiments are described above, it is not intended that these embodiments describe all possible forms of the present invention. Rather, the words used in the specification are words of description rather than limitation, and it is understood that various changes may be made without departing from the spirit and scope of the invention. Additionally, the features of various implementing embodiments may be combined to form further embodiments of the present invention.

What is claimed is:

1. An on-board battery charger (OBC) comprising:
a first rail circuit having a first rail controller configured to generate a first detection signal based on voltage events of an input voltage supplied to the first rail circuit;
a second rail circuit having a second rail controller configured to generate a second detection signal based on voltage events of an input voltage supplied to the second rail circuit;
a relay switchable between (i) an opened state in which the relay disconnects the rail circuits whereby the first and second rail circuits are configured to respectively receive first and second phase input voltages from a multi-phase mains supply and (ii) a closed state in which the relay connects the rail circuits whereby the rail circuits are configured to both receive a same input voltage from a single-phase mains supply; and
a main controller configured to determine from a comparison of the first detection signal at a given time and the second detection signal at the given time whether an input voltage supplied from a mains supply to the first rail circuit and an input voltage supplied from the mains supply to the second rail circuit are out-of-phase or in-phase to determine therefrom whether the mains supply is a multi-phase or single-phase mains supply and/or whether the relay is properly or improperly positioned in the opened state or in the closed state.

2. The OBC of claim 1 wherein:
the voltage events are threshold voltage events.

3. The OBC of claim 2 wherein:
the threshold voltage events are zero-crossing voltage events or peak voltage events.

4. The OBC of claim 1 wherein:
the main controller is further configured to pause operation of at least one of the rail circuits upon the input voltage supplied to the first rail circuit and the input voltage supplied to the second rail circuit being in-phase when the mains supply is a multi-phase mains supply and the relay is improperly in the closed state.

5. The OBC of claim 4 wherein:
the main controller is further configured to retry the relay to switch from the closed state to the opened state while operation of the at least one of the rail circuits is paused.

6. The OBC of claim 1 wherein:
the main controller is further configured to continue operation of the rail circuits while the input voltage supplied to the first rail circuit and the input voltage supplied to the second rail circuit are in-phase when the mains supply is a single-phase mains supply.

7. The OBC of claim 1 wherein:
the main controller is further configured to continue operation of the rail circuits while the input voltage supplied to the first rail circuit and the input voltage supplied to the second rail circuit are out-of-phase when the mains supply is a multi-phase mains supply.

8. The OBC of claim 1 further comprising:
a third rail circuit having a third rail controller configured to generate a third detection signal based on voltage events of an input voltage supplied to the third rail circuit;
a second relay switchable between (i) an opened state in which the second relay disconnects the first and third rail circuits whereby the first and third rail circuits are configured to respectively receive first and third phase input voltages from a multi-phase mains supply and (ii) a closed state in which the second relay connects the first and third rail circuits whereby the first and third rail circuits are configured to both receive a same input voltage from a single-phase mains supply; and
wherein the main controller is further configured to determine from a comparison of the first detection signal at the given time and the third detection signal at the given time whether the input voltage supplied from the mains supply to the first rail circuit and an input voltage supplied from the mains supply to the third rail circuit are out-of-phase or in-phase to determine therefrom whether the mains supply is a three-phase or single-phase mains supply and/or whether the second relay is properly or improperly positioned in the opened state or in the closed state.

9. The OBC of claim 8 wherein:
the voltage events are zero-crossing voltage events or peak voltage events.

10. The OBC of claim 8 wherein:
the main controller is further configured to pause operation of at least one of the rail circuits upon at least two of the input voltages supplied to the rail circuits being in-phase when the mains supply is a three-phase mains supply and at least one of the relays is improperly in the closed state.

11. The OBC of claim 10 wherein:
the main controller is further configured to retry the at least one of the relays to switch from the closed state to the opened state while operation of the at least one of the rail circuits is paused.

12. The OBC of claim 8 wherein:
the main controller is further configured to continue operation of the rail circuits while the input voltages supplied to the rail circuits are in-phase when the mains supply is a single-phase mains supply.

13. The OBC of claim 8 wherein:
the main controller is further configured to continue operation of the rail circuits while the input voltages supplied to the rail circuits are out-of-phase when the mains supply is a three-phase mains supply.

14. A method for use with an on-board battery charger (OBC) including a first rail circuit having a first rail controller, a second rail circuit having a second rail controller, a relay switchable between (i) an opened state in which the relay disconnects the rail circuits whereby the first and second rail circuits are configured to respectively receive first and second phase input voltages from a multi-phase mains supply and (ii) a closed state in which the relay connects the rail circuits whereby the rail circuits are configured to both receive a same input voltage from a single-phase mains supply, and a main controller, the method comprising:

the first rail controller generating a first detection signal based on voltage events of an input voltage supplied to the first rail circuit;

the second rail controller generating a second detection signal based on voltage events of an input voltage supplied to the second rail circuit; and the main controller determining from a comparison of the first detection signal at a given time and the second detection signal at the given time whether an input voltage supplied from a mains supply to the first rail circuit and an input voltage supplied from the mains supply to the second rail circuit are out-of-phase or in-phase to determine therefrom whether the mains supply is a multi-phase or single-phase mains supply and/or whether the relay is properly or improperly positioned in the opened state or in the closed state.

15. The method of claim 14 wherein:
the voltage events are threshold voltage events.

16. The method of claim 15 wherein:
the threshold voltage events are zero-crossing voltage events or peak voltage events.

17. The method of claim 15 further comprising:
the main controller pausing operation of at least one of the rail circuits upon the input voltage supplied to the first rail circuit and the input voltage supplied to the second rail circuit being in-phase when the mains supply is a multi-phase mains supply and the relay is improperly in the closed state.

18. The method of claim 15 further comprising:
the main controller retrying the relay to switch from the closed state to the opened state while operation of the at least one of the rail circuits is paused.

19. The method of claim 14 wherein the OBC further includes a third rail circuit having a third rail controller and a second relay switchable between (i) an opened state in which the second relay disconnects the first and third rail circuits whereby the first and third rail circuits are configured to respectively receive first and third phase input voltages from a multi-phase mains supply and (ii) a closed state in which the second relay connects the first and third rail circuits whereby the first and third rail circuits are configured to both receive a same input voltage from a single-phase mains supply, the method comprising:

the third rail controller generating a third detection signal based on voltage events of an input voltage supplied to the third rail circuit; and the main controller determining from a comparison of the first detection signal at the given time and the third detection signal at the given time whether the input voltage supplied from the mains supply to the first rail circuit and an input voltage supplied from the mains supply to the third rail circuit are out-of-phase or in-phase to determine therefrom whether the mains supply is a three-phase or single-phase mains supply and/or whether the second relay is properly or improperly positioned in the opened state or in the closed state.

20. The method of claim 19 wherein:
the voltage events are zero-crossing voltage events or peak voltage events.

* * * * *